(12) United States Patent
Gober (10) Patent No.: US 6,748,939 B1
(45) Date of Patent: Jun. 15, 2004

(54) GRILL AND OUTDOOR FIREPLACE

(76) Inventor: Teddy L. Gober, 1213 Kelpie Ct., Fort Worth, TX (US) 76111

( * ) Notice: Subject to any disclaimer, the term of this patent is extended or adjusted under 35 U.S.C. 154(b) by 0 days.

(21) Appl. No.: 10/417,563

(22) Filed: Apr. 17, 2003

(51) Int. Cl.[7] ................................................ A47J 37/00
(52) U.S. Cl. ........................ 126/25 R; 126/9 R; 126/50; 126/305; 126/506
(58) Field of Search .................................. 126/9 R, 9 A, 126/9 B, 25 R, 50, 304 R, 305, 8, 38, 4, 506, 544, 41 R; 99/340, 448, 450

(56) References Cited

U.S. PATENT DOCUMENTS

| | | | | |
|---|---|---|---|---|
| 4,884,551 A | * | 12/1989 | Hait | 126/9 R |
| 5,195,423 A | * | 3/1993 | Beller | 99/340 |
| 5,284,125 A | * | 2/1994 | Hunziker | 126/25 R |
| 5,325,841 A | * | 7/1994 | Hooper, Sr. | 126/25 R |
| 6,178,965 B1 | * | 1/2001 | Sulak | 126/519 |
| 6,321,640 B1 | * | 11/2001 | Tseng | 99/340 |

* cited by examiner

Primary Examiner—James C. Yeung
(74) Attorney, Agent, or Firm—Geoffrey A. Mantooth; Arthur F. Zobal (57) ABSTRACT

A support frame with legs is provided for supporting a chamber member with walls that taper inward from its upper end to an ash removal opening and a middle member forming a heating cavity. The upper end of the middle is adapted to support an upper member with walls that taper inward from its lower end to an upper vent. A lower grate is supported at the lower opening of the middle member for holding material to be burned. An upper grate is supported at the upper end of the middle member for supporting food to be cooked. In a further aspect, a side opening is formed through the wall of the middle member for use for adding burnable material on the lower grate. The four members can be broken down and stacked together in a small volume.

8 Claims, 11 Drawing Sheets

GRILL AND OUTDOOR FIREPLACE

BACKGROUND OF THE INVENTION

1. Field of the Invention

The invention relates to an apparatus which may serve as a grill and outdoor fireplace and which can be easily broken down and the parts stacked together in a small volume.

2. Description of the Prior Art

SUMMARY OF THE INVENTION

The invention comprise a support frame with legs for supporting a lower member with walls that taper inward from its upper end to an ash removal opening and a middle member forming a heating cavity. The upper end of the middle member is adapted to support an upper member with walls that taper inward from its lower end to an upper vent. A lower grate is that taper inward from its lower end to an upper vent. A lower grate is supported at the lower opening of the middle member for holding material to be burned. An upper grate is supported at the upper end of the middle member for supporting food to be cooked.

In a further aspect, an opening is provided in the middle member for use for adding burnable material on the lower grate.

The four members including the grates can be broken down and stacked together in a small volume.

DESCRIPTION OF THE PREFERRED EMBODIMENTS

Referring now to the drawings, the heating and cooking apparatus 19 comprises a support frame 21; a lower ash chute 23, a wood or charcoal grate 25, a middle heating enclosure 27, an upper food cooking grate 29, and an upper cooking chamber or oven 31.

Figure 4:
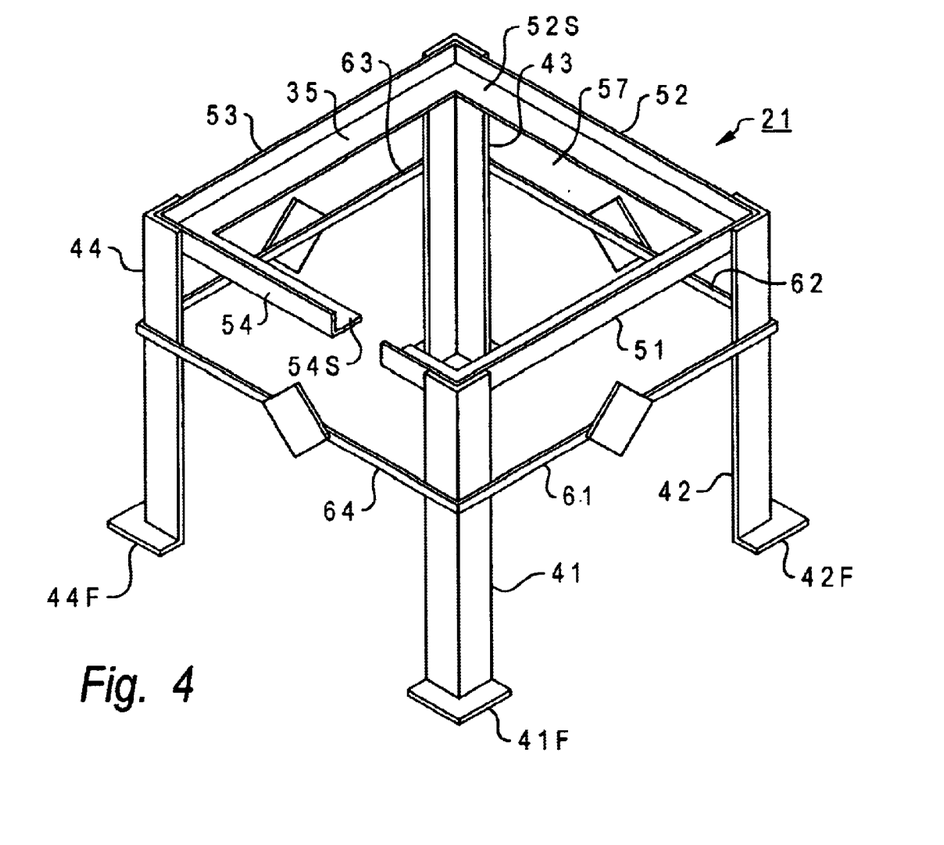
FIG. 4 is an isometric view of a frame which supports the lower tapered ash chute shown in FIG. 5.
Figure 5:
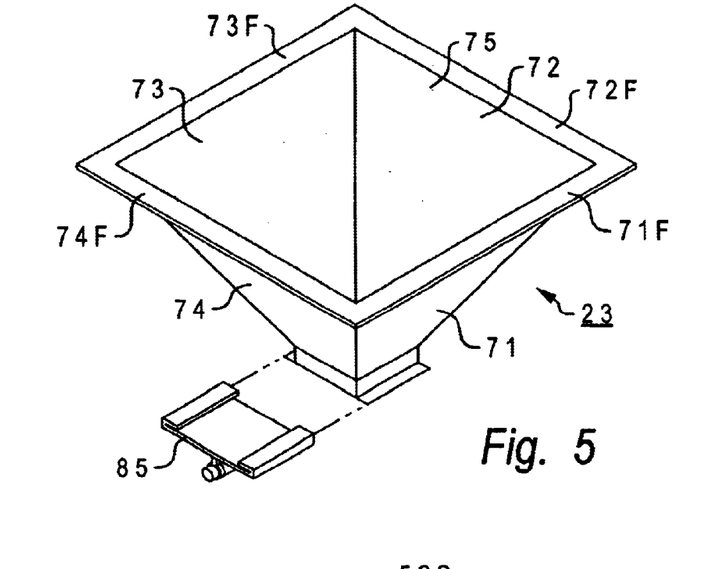

Referring to FIG. 4, the frame 21 has four identical legs 41–44 formed of metal angle iron each with an L-shaped metal foot 41F–44F welded to its lower end. Metal angle irons 51–54 are welded between adjacent legs for holding the legs together forming an upper square opening 57 with lateral shelf members 51S–54S for supporting the ash chute 23. Member 54S is shown in the broken section in FIG. 4. Metal members 61–64 also are welded to adjacent legs for providing additional support for the legs.

The ash chute 23 is formed of four identical sheet metal walls 71–74 each in the shape of a trapezoid with adjacent edges welded or secured together such that its upper end has a large square opening 75 with the walls 71–74 tapering downward to a smaller square opening 77. A small square metal wall 79 is welded to the lower ends of the walls 71–74 to extend the opening 77 downward. Two metal flanges 81 extend from opposite sides of the bottom of the wall 79 for sliding engagement in two slots 83 of a metal door 85. The door 85 can be moved by way of a handle 87 to a closed position as shown in FIG. 3B to close the opening 77 and to an open position as shown in FIG. 4 to allow ashes to be removed by way of the opening 77 from the inside of the chute 23.

Figure 1:
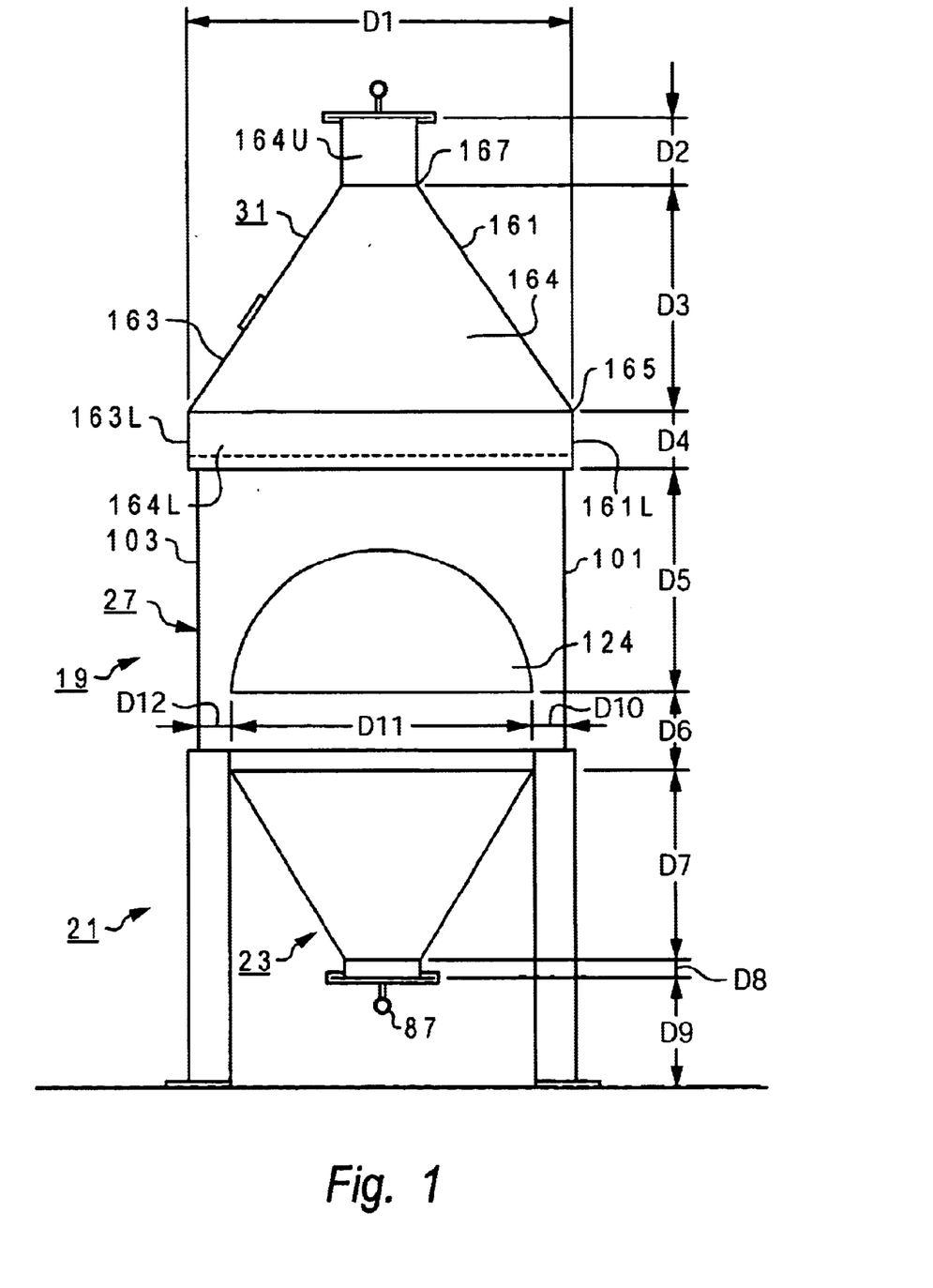
FIG. 1 illustrates one side of the assembled apparatus of the invention. The side opposite that of FIG. 1 is the same as that of FIG. 1 except for the thermometer on the top member.
Figure 2:
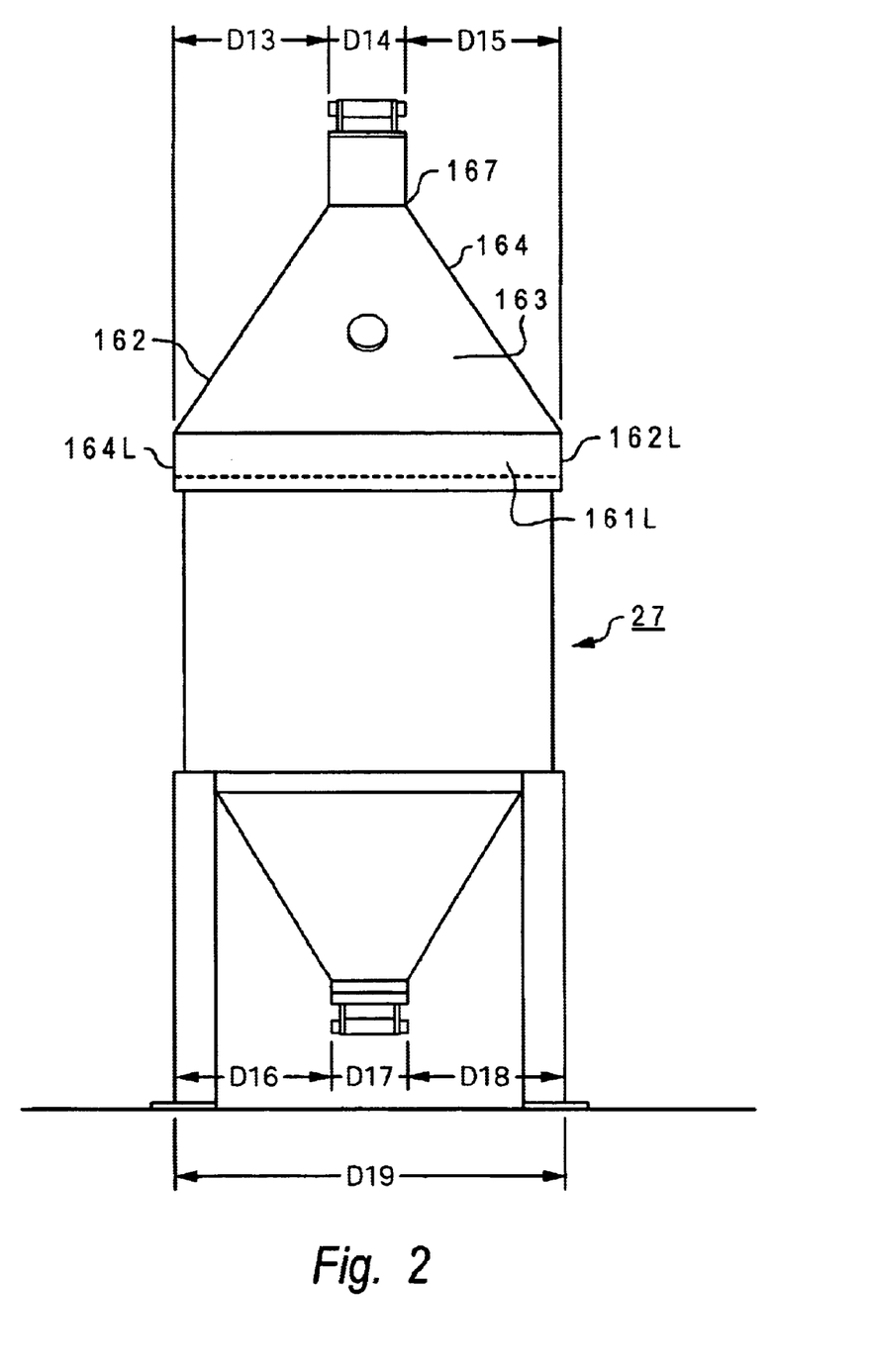
FIG. 2 illustrates a side 90 degrees from that of FIG. 1. The side opposite that of FIG. 2 is the same as that of FIG. 2 except for the thermometer on the top member.
Figure 3A:
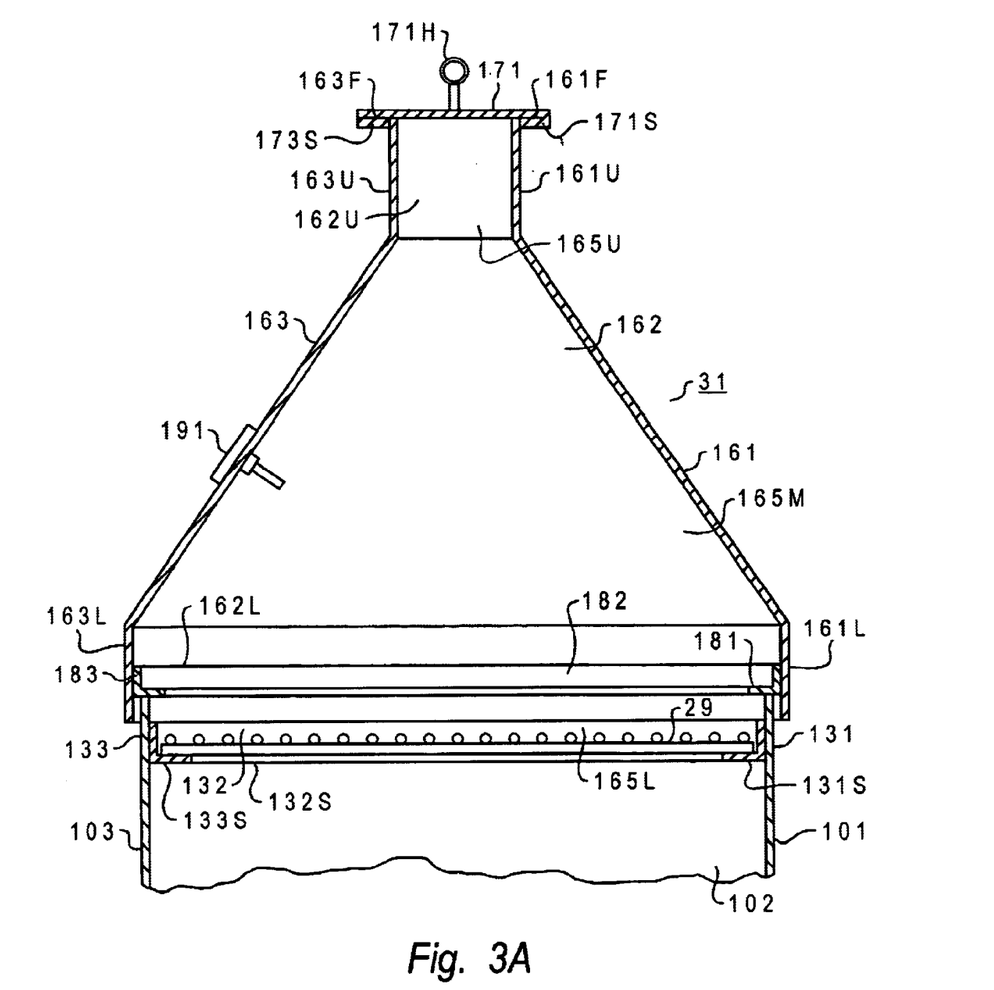
FIGS. 3A and 3B are cross-sections of the assembled apparatus of FIG. 1. The lower end of FIG. 3A connects with the upper end of FIG. 4B.
Figure 3B:
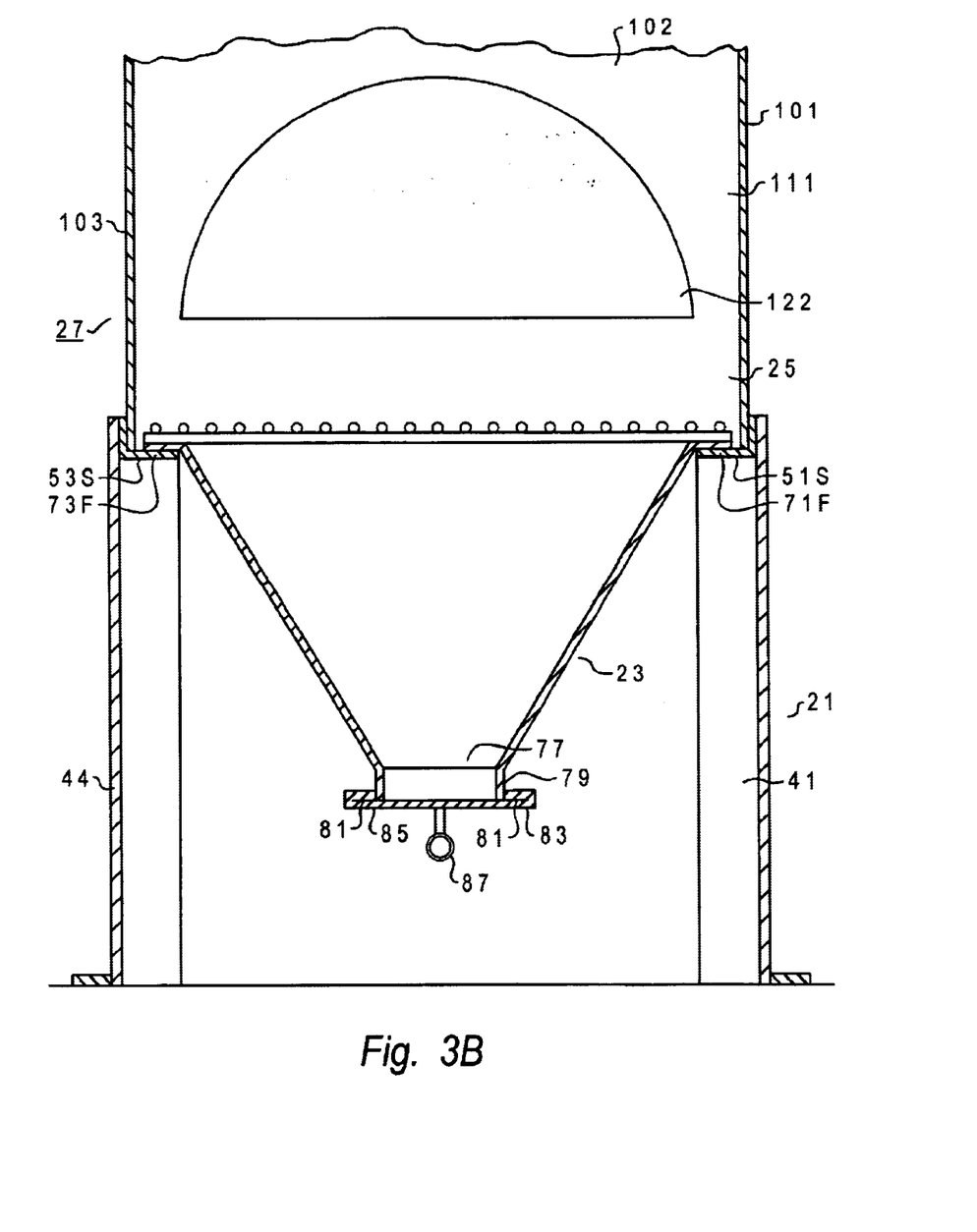

The lower ash chute 23 has four flanges 71F–74F extending outward from the upper ends of its walls 71–74 such that the lower portion of the chute 23 can be inserted through the frame opening 57 and removably supported in the position as shown in FIG. 3B by the flanges 71F–74F engaging the shelf members of the angle irons 51–54.

Removably supported on the flanges 71 F–74F is the lower grate 25.

The middle member 27 is formed of four sheet metal plates 101–104 with the edges of adjacent plates welded together to form a square opening 111 extending between the upper end 27U and lower end 27L of the member 27. The lower edge of the walls 101–104 are removably supported on the metal angle iron shelves 51S–54S in the assembled condition.

Two half round openings 122 and 124 are formed through the walls 102 and 104 to allow wood or charcoal to be added onto the grate 25 if desired, while the apparatus is in an assembled condition.

Figure 6:
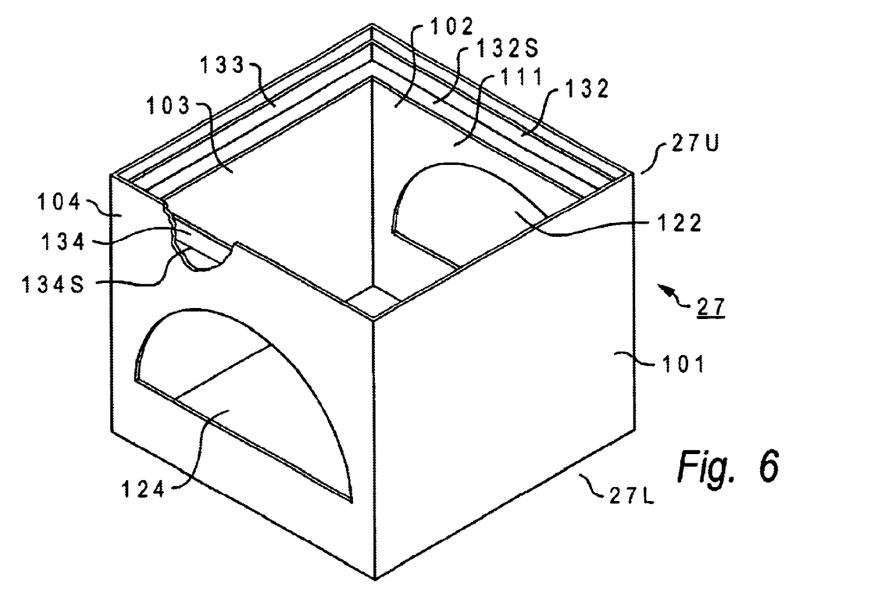
FIG. 6 is an isometric view of the middle heating member.

Four metal angle irons 131–134 are welded to the inside of the walls 101–104 near the upper end of the member 27 to form four shelf portions 131S–134S to removably support the upper grate 29. Member 134 is shown in the broken section in FIG. 6.

The upper member 31 is formed of four identical trapezoidal shaped metal sheets 161–164 having adjacent edges welded together to form the chamber 31 which tapers inward from end 165 to end 167. Welded to the top ends of sheets 161–164 are four square metal sheets 161U–164U. Adjacent edges of sheets 161U–14U are welded together. Welded to the bottom ends of sheets 161–164 are four rectangular metal sheets 161L–164L. Adjacent edges of sheets 161L–164L are welded together. The chamber 31 thus has a lower opening 165L which merges to opening 165M which tapers upward and which merges with the small opening 165U. The walls 161U and 163U have outward extending metal flanges 161F and 163F which fit in slots 171S and 173S of a metal door 171 such that the door 171 can be slid to a closed position by way of a handle 171H and to an open position.

Four metal angle irons 181, 182, 183, 184 are welded to the inside of walls 161L, 162L, 163L, 164L which can engage the tops of walls 101, 102, 103, 104 to removably support the chamber 31 when the apparatus is in an assembled condition. Member 184 is shown in the broken section in FIG. 9.

Member 191 is a thermometer.

Thus the members 21, 23, 25, 27, 29, 31 are removably coupled together to form the grill and fireplace apparatus 19.

In one embodiment, the dimensions D1–D19 may be those listed in Table 1 however, it is to be understood that these dimensions may vary. In addition, the shapes of the members 21, 23, 25, 27, 29, and 31 also may vary. For example, members 21, 23, and 27 may be rectangular in cross-section with grates 25 and 29 being rectangular. Also members 21, 23, and 27 may be circular in cross-section wherein chute 21 and upper member 31 will be cone shaped; member 27 will be cylindrical; and grates 25 and 29 will be circular.

TABLE 1

(Dimensions Are In Inches)

| | |
|---|---|
| D1 | 20 |
| D2 | 4 |
| D3 | 12 |
| D4 | 4 |
| D5 | 11 1/4 |
| D6 | 4 |
| D7 | 10 |
| D8 | 1 |
| D9 | 6 1/4 |
| D10 | 2 |
| D11 | 15 3/4 |
| D12 | 2 |
| D13 | 8 |
| D14 | 4 |
| D15 | 8 |
| D16 | 8 1/8 |
| D17 | 4 |
| D18 | 8 1/8 |
| D19 | 20 1/4 |

Figure 7:
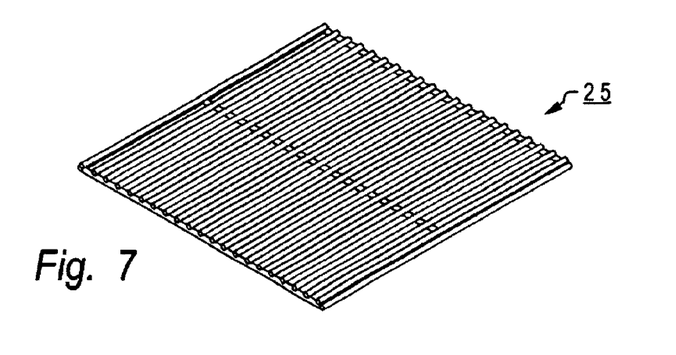
FIG. 7 is a lower firewood grate.
Figure 8:
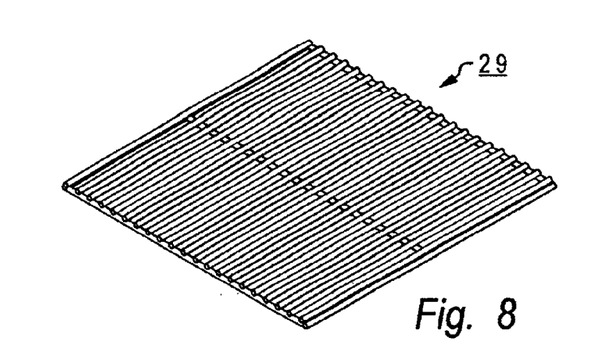
FIG. 8 is an upper food grate.
Figure 9:
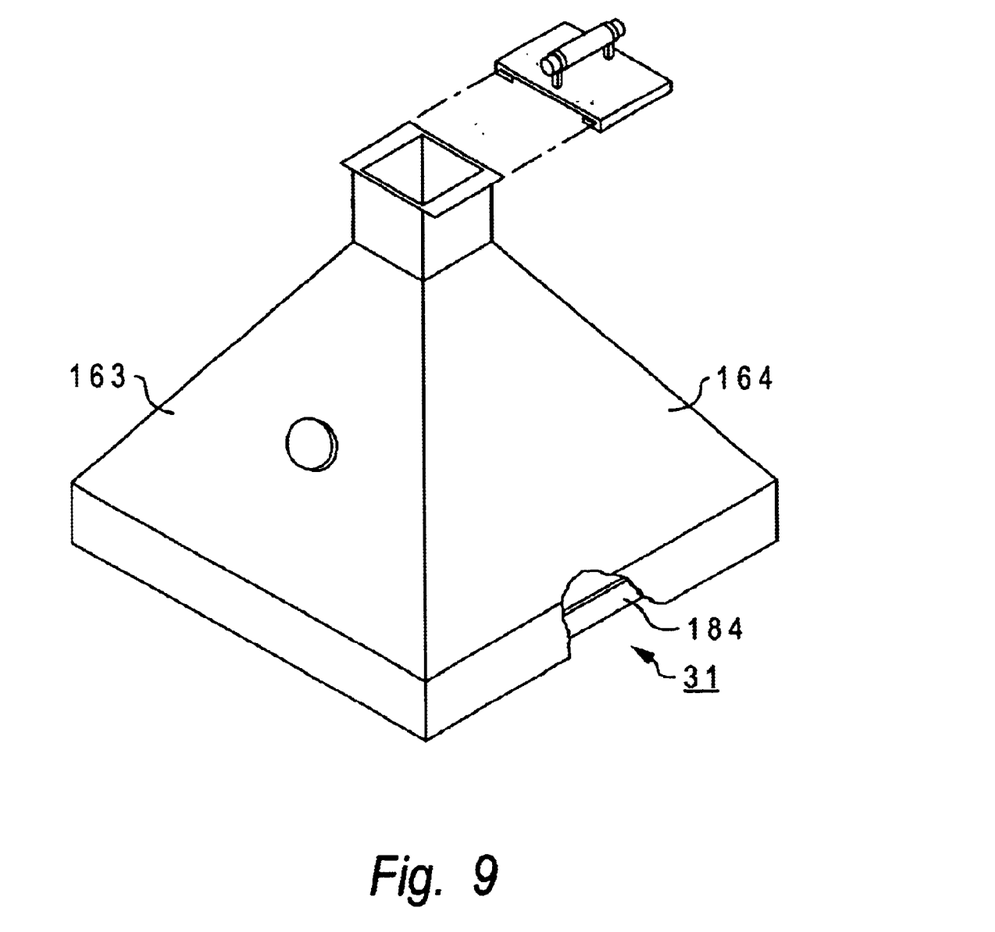
FIG. 9 is an isometric view of the upper cooking hood and vent.
Figure 10:
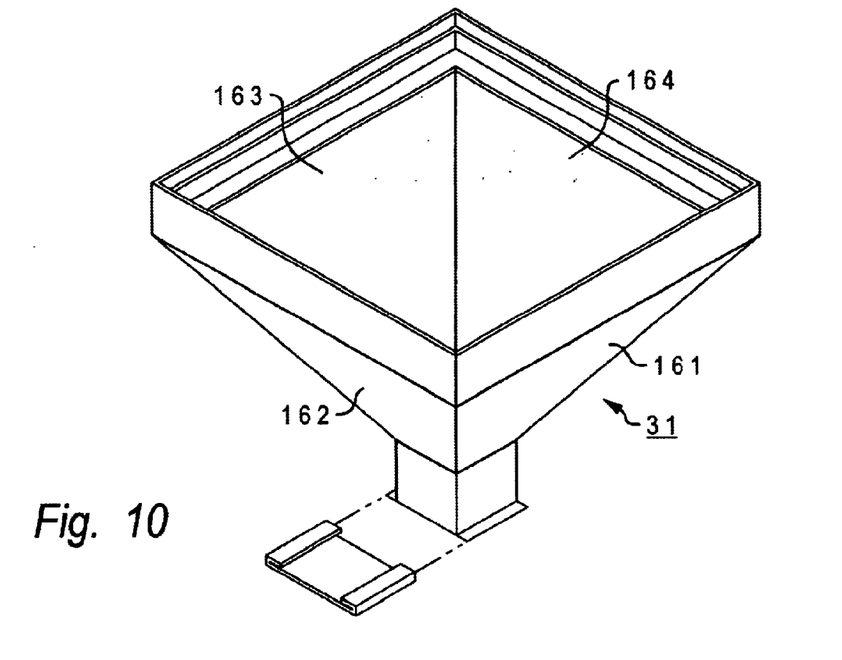
FIGS. 10–15 illustrates the sequence of stacking the components of the apparatus to produce the disassembled and stacked assembly shown schematically in FIG. 16.
Figure 11:
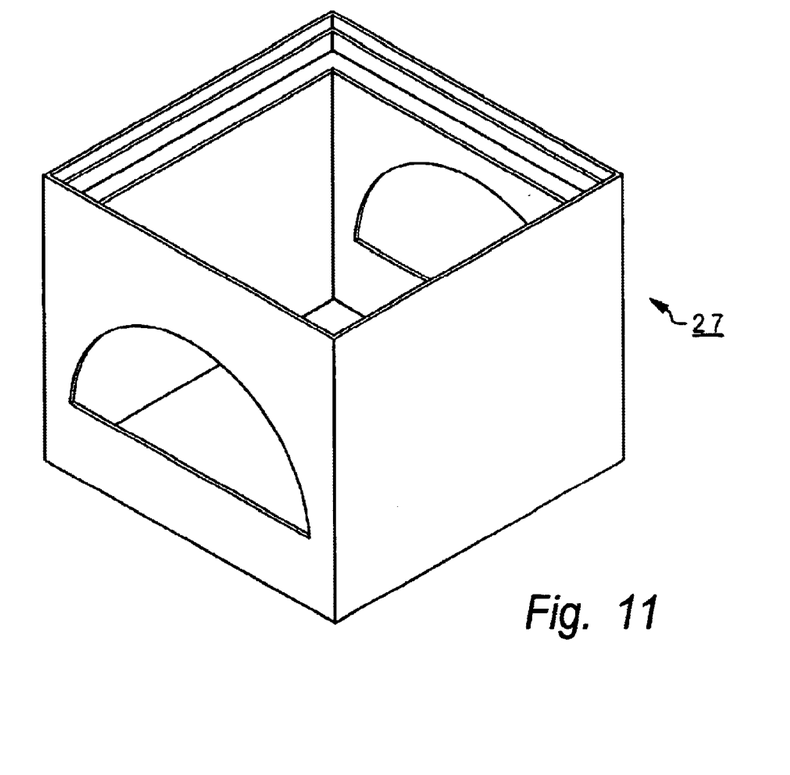
Figure 12:
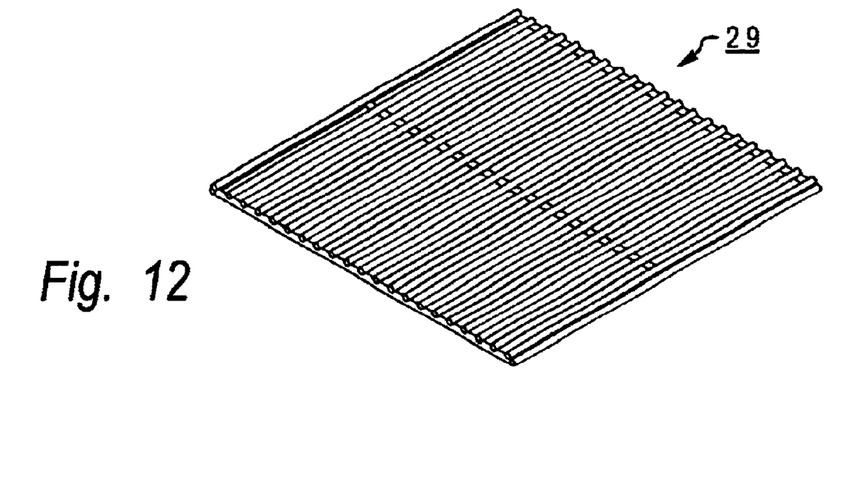
Figure 13:
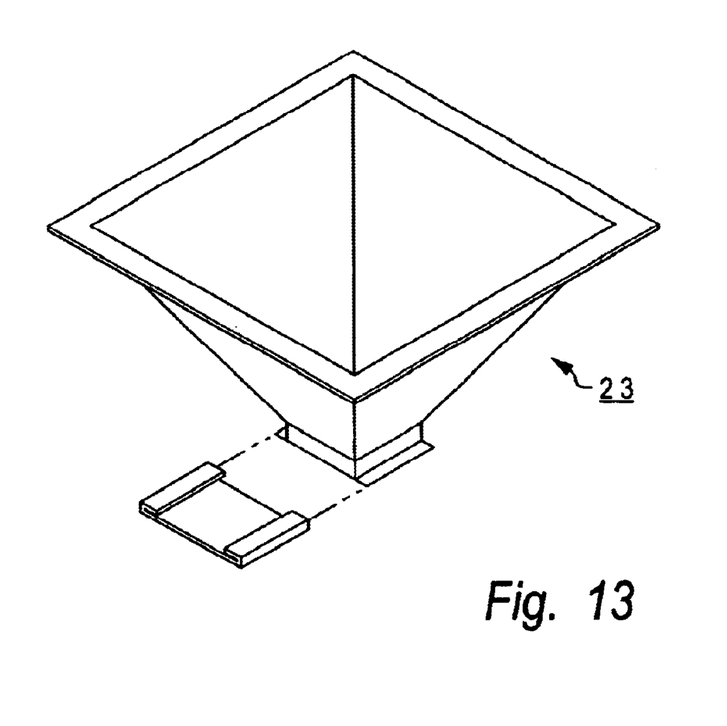
Figure 14:
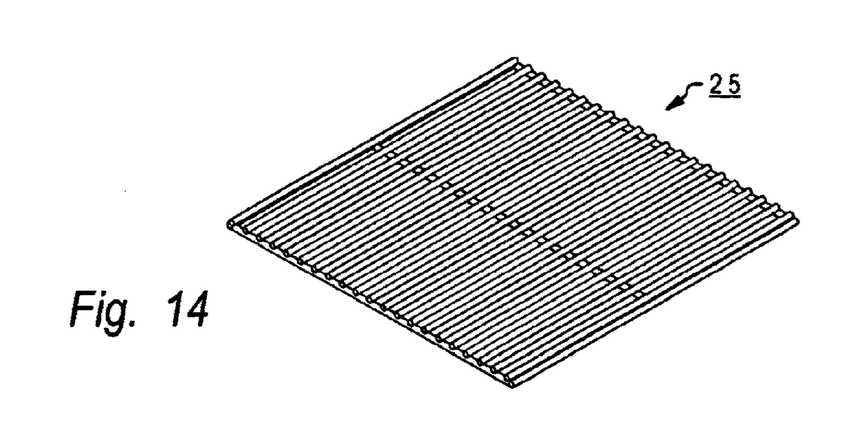
Figure 15:
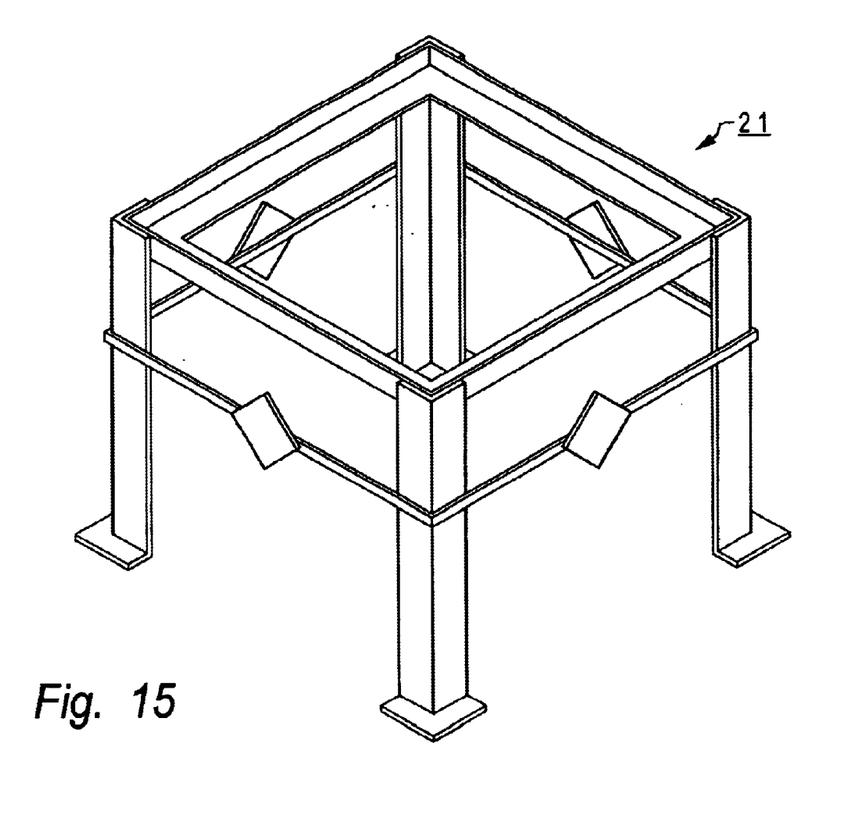
Figure 16:
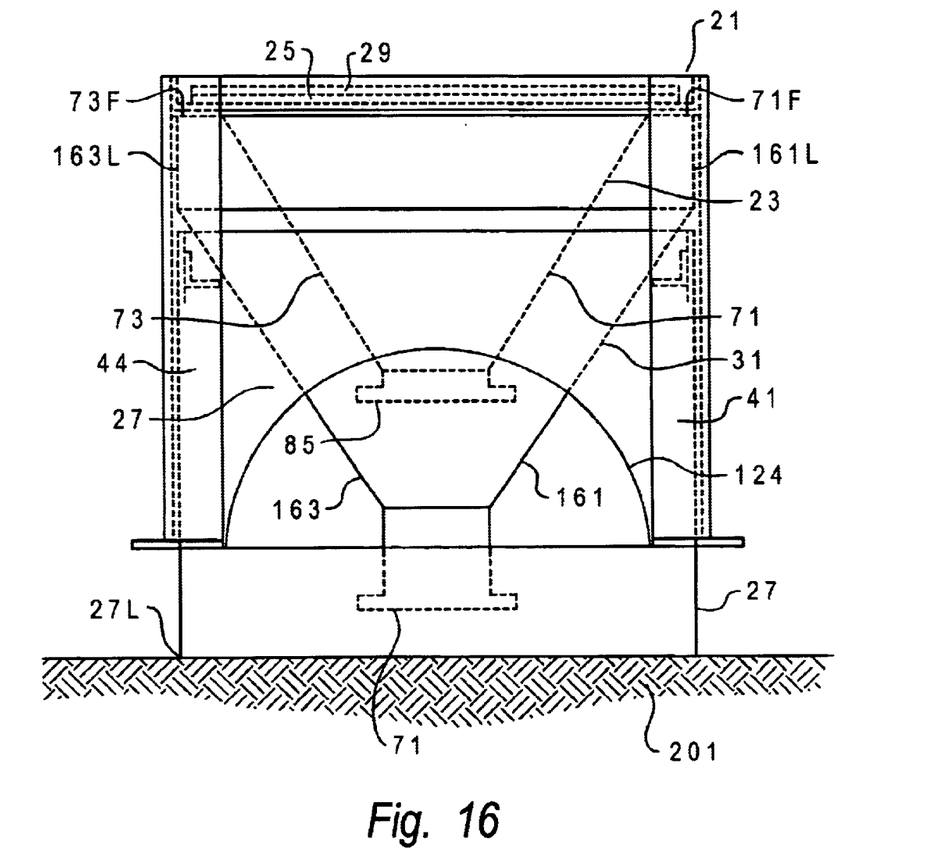

The apparatus can be disassembled and stacked in a small volume as shown in FIG. 10. Referring to FIGS. 7–9, the stacking process is as follows. The lower edge 27L of the member 27 is placed on a flat surface 201. The door 171 of chamber member 31 is removed from member 31 and member 31 is inserted into the opening 111 of member 27 with its top end wall 161U–164U facing downward. In this position the wall 161L–164L of member 31 cannot fit into the opening 111 of member 27 and extends above the upper edge 27U of member 27. Ash chute member 23 then is located in the opening 165L, 165M of member 31 with its square wall member 79 located downward. The grates 25 and 29 then are placed on the flange 71F–74F. Finally, the frame member 21 is placed such that its legs 41–44 straddle and are located outside of the wall 101–104 with the flange 71F–74F resting on the top of the edges of walls 161L–163L of chamber member 31. For a unit having the dimensions of Table 1, the broken down and stacked assembly forms a volume of about 2'×2'×2'.

The invention is designed to encompass three different products into one and make some vast improvements on some of the inherent problems with all other products of this type. This combination outdoor fireplace, wood fired grill and smoker is designed so ashes can be quickly removed without breaking down the grill components. The ashes are dumped via a chute in the bottom of the firebox. More firewood can be added as needed through the arched openings of the middle portion of the apparatus, also without breaking down the grill.

In addition, the top of the apparatus is removable to allow for access to food being grilled. The cap at the top of the chimney allows for control of the fire and smoke if necessary. It also can be closed when finished to protect the inside from rain. The apparatus has three separate sections designed to fit on the outside of the section below to keep the rain out when not in use and the smoke and heat inside and rising to the top when in use creating a convection oven effect. The pieces also make it easy to break down for portability. No screws, bolts, or nuts of any kid are required to assemble the apparatus. A rain jacket can also be used to keep blowing rain out of the two arched openings.

In addition, the fire and smoke being directly below the food allows for faster cooking than conventional side mounted firebox smokers. The food grate can be removed or left in to use the apparatus as an outdoor fireplace for patio heating and enjoyment. Because the apparatus can be quickly used with very little preparation, it is as easy to use as a gas grill and much easier to use than any known outdoor fireplace or chimenea.

In addition, the apparatus can be broken down and stacked within its self down to a small volume for easy portability. It serves as a grill and smoker for all necessary cooking and serves as a very safe outdoor fireplace for warmth and enjoyment.

What is claimed is:

1. A heating and cooking apparatus, comprising:

a support member having a frame with an opening formed therethrough and legs for supporting said frame, a lower member having an upper end with an upper opening and a lower end with a lower opening smaller than said upper opening and a surrounding lower side wall defining an interior surface extending from said upper opening to said lower opening such that said lower side wall tapers inward from said upper opening to said lower opening, a door supported for movement between a closed position and an open position for closing and opening said lower opening respectively to allow said lower member to hold ashes when said door is in said closed position and to allow ashes to be removed from said lower member when said door is in said open position, said lower member being adapted to be removably supported by said frame with said lower side wall extending through said opening of said frame, a middle member having a surrounding middle side wall defining a heating cavity extending between upper and lower ends of said middle member and having upper and lower openings respectively, said lower end of said middle member being adapted to be removably supported next to said upper end of said lower member with a lower grate located next to said lower opening of said middle member for holding material to be burned, and an upper member having an upper end with an upper opening and a lower end with a lower opening larger than said upper opening of said upper member and a surrounding upper side wall defining an interior surface extending from said lower opening of said upper member to said upper opening of said upper member such that said upper side wall tapers inward from said lower opening of said upper member to said upper opening of said upper member, said lower end of said upper member being adapted to be removably supported next to said upper end of said middle member with an upper grate located near said lower opening of said upper member for holding food to be cooked.

2. The apparatus of claim 1, wherein:

said lower member comprising an upper flange extending outward from said lower side wall at said upper end of said lower member, said frame comprising L-shaped members having an upward extending portions and inward extending portion with said inward extending portions being employed to support said upper flange of said lower member, said lower grate and said lower end of said middle member, said lower end of said upper member comprises an inward extending flange adapted to be supported by said upper end of said middle member, and an inward extending flange coupled to said upper end of said upper member for supporting said upper grate.

3. The apparatus of claim 1, wherein:

said upper, middle, and lower members and said upper and lower grates may be completely disassembled from each other.

4. The apparatus of claim 1, comprising:

a side opening formed through said side wall of said middle member to allow burnable material to be inserted onto said lower grate.

5. The apparatus of claim 2, wherein:

said upper, middle, and lower members and said upper and lower grates may be completely disassembled from each other.

6. The apparatus of claim 2, comprising:

a side opening formed through said side wall of said middle member to allow burnable material to be inserted onto said lower grate.

7. The apparatus of claim 3, comprising:

a side opening formed through said side wall of said middle member to allow burnable material to be inserted onto said lower grate.

8. The apparatus of claim 3, wherein:

when said members and said grates are disassembled, they may be stacked together with said upper member located in said cavity of said middle member such that said lower end of said upper member is located close to said lower end of said middle member and said lower end of said upper member faces outward, said lower member is located partially in said middle member and partially in said upper member with said lower end of said lower member facing said upper end of said upper member and said upper end of said lower member faces outward, and said frame is located next to said upper end of said middle member with said legs straddling said side wall of said middle member.

* * * * *